April 24, 1928.  1,667,291

C. O. LAVETT
APPARATUS FOR SPRAYING AND TREATING LIQUIDS
Filed Aug. 11, 1924  3 Sheets-Sheet 1

Inventor
Charles O. Lavett
by Pobb & Powers
Attorneys.

April 24, 1928.
C. O. LAVETT
1,667,291
APPARATUS FOR SPRAYING AND TREATING LIQUIDS
Filed Aug. 11, 1924   3 Sheets-Sheet 2
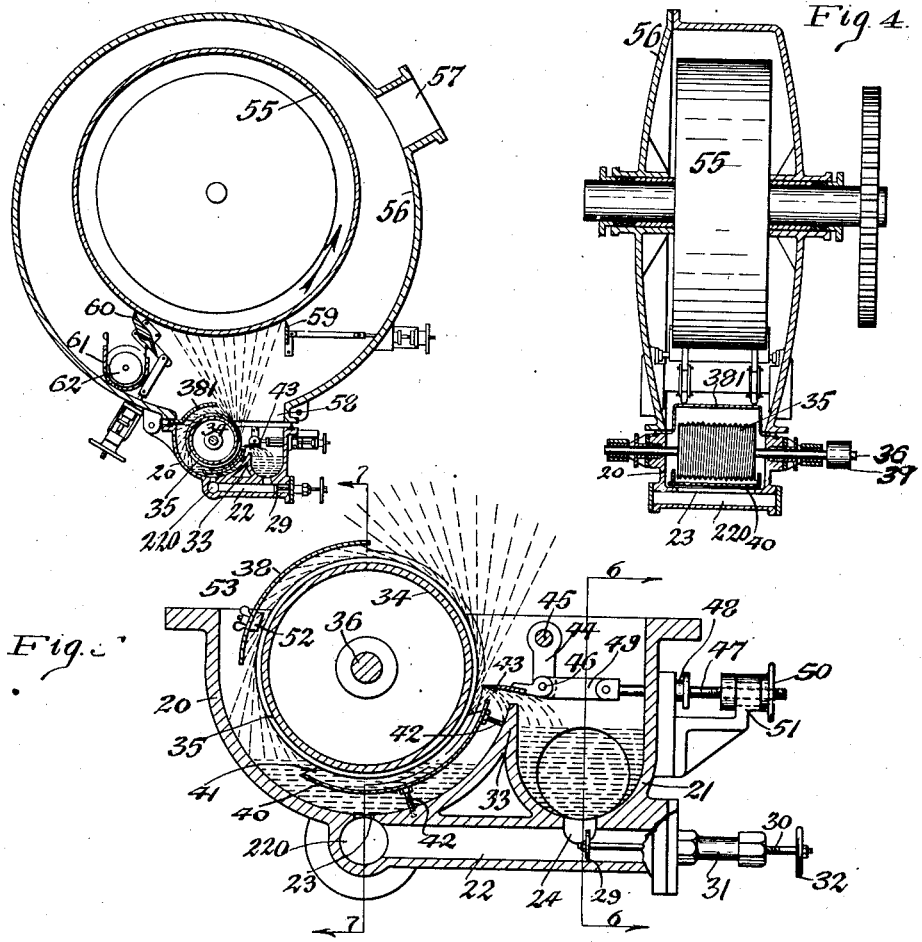
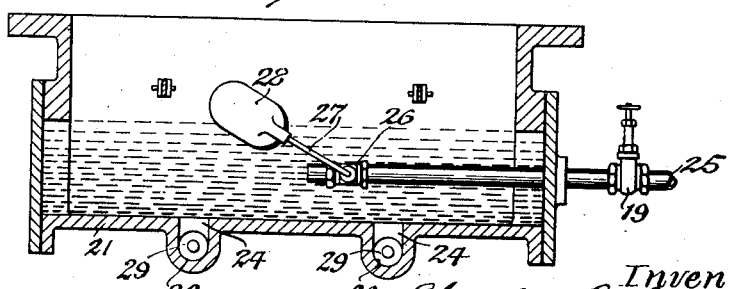
Inventor
Charles O. Lavett
by Volpe & Powers
Attorneys April 24, 1928.
C. O. LAVETT
1,667,291
APPARATUS FOR SPRAYING AND TREATING LIQUIDS
Filed Aug. 11, 1924      3 Sheets-Sheet 3
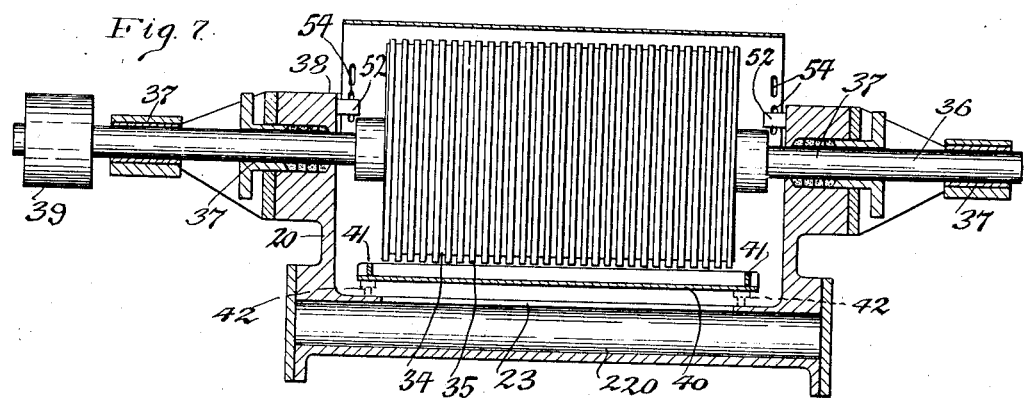
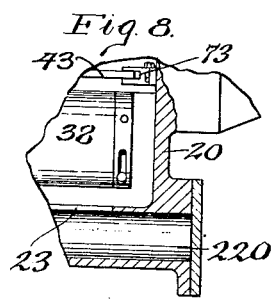
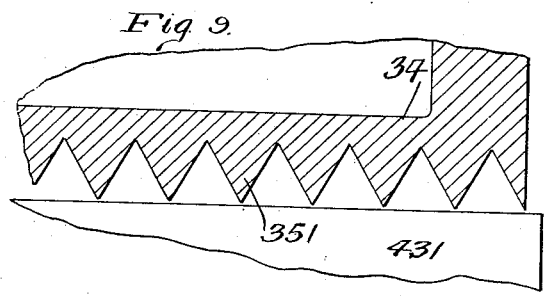
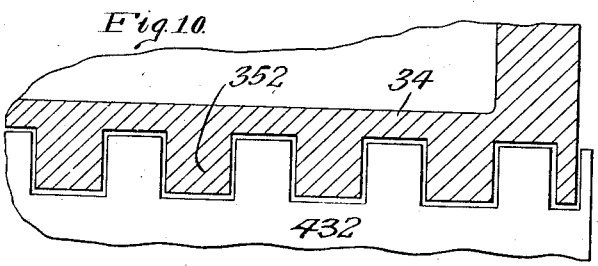
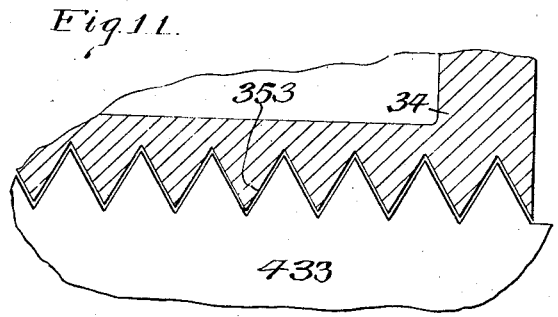
Charles O. Lavett Inventor
by Polk & Powers Attorneys.

Patented Apr. 24, 1928.

1,667,291

UNITED STATES PATENT OFFICE.

CHARLES O. LAVETT, OF BUFFALO, NEW YORK, ASSIGNOR, BY MESNE ASSIGNMENTS, TO BUFFALO FOUNDRY & MACHINE CO., OF BUFFALO, NEW YORK, A CORPORATION OF NEW YORK.

APPARATUS FOR SPRAYING AND TREATING LIQUIDS.

Application filed August 11, 1924. Serial No. 731,254.

This invention relates to an apparatus for spraying liquids preparatory to drying, cooling or crystallizing the same. Heretofore spraying of liquids has been attempted by forcing the same under high pressure through a nozzle; also by passing a current of air at a high velocity and at right angles over the outlet end of a small pipe while the inlet end of the same is immersed in the solution to be sprayed, thereby creating a partial vacuum in the pipe, the difference in pressure forcing the liquid through the pipe and vaporizing the same at the outlet thereof; and also by revolving a flat disk horizontally at a high speed and slowly feeding a liquid on top of the disk so that the latter would throw the same off in an atomized form.

These methods of spraying are unsatisfactory owing to the fact that the nozzles become clogged and necessitate straining the solution, the frequent renewal of the nozzles due to wear, the high air pressure required and the need for air compressors, and the difficulty of controlling the solution when fed to a disk.

It is the object of the invention to provide a liquid spraying device for use in drying, cooling or crystallizing the same in which the above mentioned objections are avoided, and which permits of accomplishing the purpose efficiently, economically and expeditiously.

In the accompanying drawings;

Figure 3, is a vertical section of a vacuum drum drying apparatus equipped with another form of my liquid spraying device.

Figure 4 is a longitudinal section of the same.

Figure 5 is a vertical transverse section of another form of liquid spraying device embodying my invention.

Figure 6, is a vertical longitudinal section taken on line 6—6 Figure 5.

Figure 7, is a vertical longitudinal section taken on the correspondingly numbered line in Figure 5, Figure 8, is a fragmentary vertical longitudinal section showing a modified form of the means for mounting the liquid controlling blade of my improved spraying device on the adjacent part of the casing.

Figures 9, 10 and 11 are fragmentary longitudinal sections, on an enlarged scale, showing different forms of the spraying ribs arranged circumferentially on the spraying cylinder.

Similar characters of reference indicate like parts in the several figures of the drawings.

Figure 1:
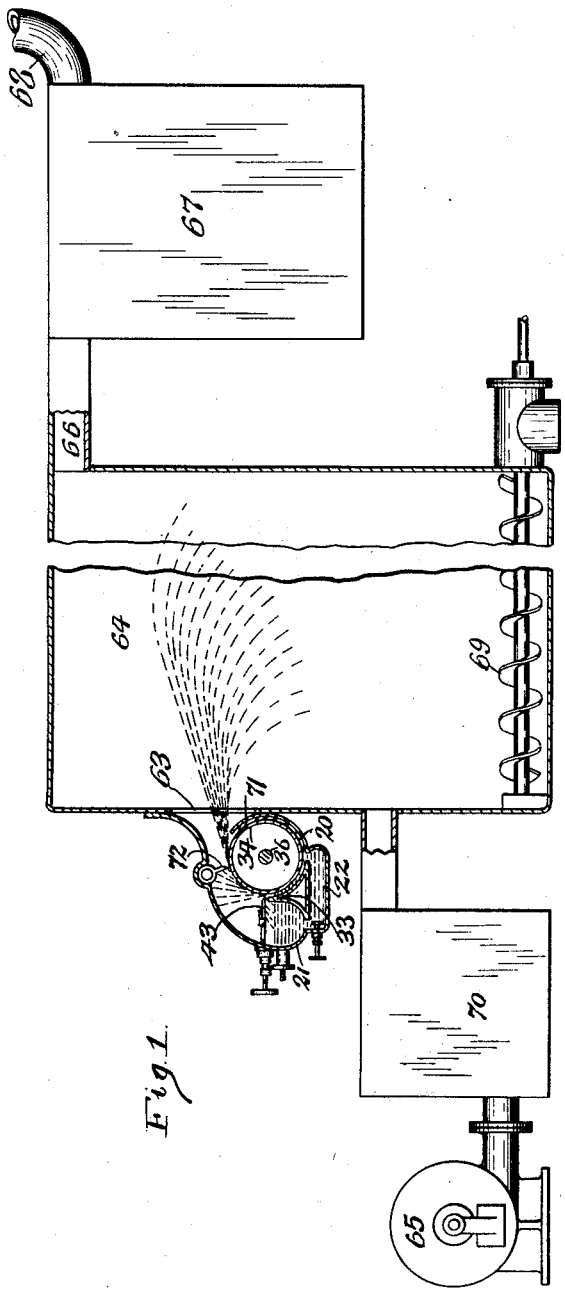
Figure 1, is a vertical longitudinal section showing one form of my improved spraying apparatus used in connection with an atmospheric drying and crystallizing chamber.

My improved spraying apparatus may be variously organized, that form of the same shown in Figures 5, 6 and 7, being constructed as follows:—

The numeral 20 represents a feed trough or chamber which is adapted to contain the liquid to be sprayed and 21 represents a supply trough or chamber which is adapted to contain a supply of such liquid for replenishing the feed trough. The two troughs may be constructed in any suitable manner but are preferably formed of cast metal as shown in Figures 5, 6 and 7.

Communication is established between these troughs in the present example by means of two horizontal conduits 22 arranged below the troughs near opposite ends thereof and opening at their ends into the lower most parts of the feed and supply troughs by a longitudinal passage 220 and upright passages 23 and 24 so that the liquid can flow from the supply trough into the feed trough and replenish the latter as the liquid is discharged during the spraying operation. The liquid to be sprayed is introduced into this supply trough from any available source by a supply pipe 25 having a hand valve 19. The entrance of the liquid into the supply trough for maintaining the level of the same in this trough at a predetermined height is automatically controlled or regulated by a regulating or controlling valve 26 the rotary plug of which is connected by an arm 27 with a float 28 which rises and falls in response to variation in the level of the liquid. When this level drops below normal the descent of the float opens the valve 26 and admits liquid and when the normal level has been restored the rising float again closes the valve. The flow of the liquid from the supply trough to the feed trough is controlled by regulating means operating on the conduits and passages connecting these troughs. Suitable means for this purpose are shown in figures 5 and 6 and these consist of valves 29 movable lengthwise in the conduit so as to cut off the inlet passages 24 of the same more or less. Each of these valves is mounted on the inner end of a threaded valve stem 30 which extends lengthwise through a stuffing box 31 at the outer end of the respective liquid conduit and is provided externally of this conduit with a handle 32 for manipulating the same. Upon moving the regulating valves 29 inwardly the inlet passages are cut off more and thus retard the flow of liquid from the supply trough to the feed trough and vice versa and thus maintaining the level of liquid in the feed trough at such a height during the operation of the apparatus as will secure the best results.

The supply and feed troughs are preferably of semi-cylindrical form in cross section and the same are arranged close together and separated from each other by a single intervening wall 33 which is about one half the height of the outer walls of these troughs, as shown in Figure 5.

Arranged lengthwise and horizontally within the feed troughs is a liquid projecting roll which in its preferred form has a cylindrical body 34 and a plurality of ribs 35 arranged circumferentially on the periphery of the body. This roll is rotatably mounted within the feed trough so that the same is concentric with the bottom of this trough and the ascending part of the roll is next to the partition or dividing wall 33 between the troughs. For this purpose this roll is mounted on a horizontal shaft 36 which is journalled in suitable bearings 37 in the end walls of the feed trough and provided externally of the latter with a driven pulley 39 to which power may be applied by a belt from any suitable source.

The level of the liquid in the feed trough is maintained at such height that the lower part of the cylindrical body and the ribs of the projecting roll dip into the same a considerable extent so that when this roll rotates its underside picks up a considerable quantity of liquid by frictional contact therewith and raises the same in the form of a stream which is projected upwardly on the ascending side of the roll which is next to the wall 33. In order to enable the roll to obtain a firm frictional grip on the liquid and ensure raising a stream of considerable thickness means are provided for holding the liquid against the ascending part of the roll and confining the same so that it cannot be thrown tangentially away from the roll by centrifugal force until the liquid has reached the top of the partition or wall 33. Various means may be employed for accomplishing this purpose, those shown in Figures 5 and 7, consisting of a baffle having a curved body 40 which is arranged concentrically or substantially so relatively to the axis of the roll and extends under the latter and upwardly between the ascending side thereof to the top of the partition 33 but separated from the roll by an intervening throat. At its opposite ends this baffle body is provided with upright end walls or flanges 41 which extend along the opposite ends of the roll and confine the liquid in engagement therewith. This baffle may be adjusted radially toward and from the roll by any suitable means for varying the width of the throat between the roll and the baffle body, this being effected in the present instance by a plurality of adjusting screws 42 secured to the bottom of the feed trough and supporting the baffle, as shown in Figure 5, upon running these screws inwardly the baffle will be moved closer to the projecting roll and when running the same down the baffle will be moved away from the roll thus adapting the adhesive effect to the various kinds of materials and conditions to secure the best results.

Means are provided for controlling the quantity of liquid which is projected from the roll and to obtain a fine and uniform spray while the surplus is returned to the supply trough ready to be again circulated. The means for this purpose shown in Figures 5 and 6 comprises a controlling blade 43 arranged horizontally above the upper edges of the baffle and the partition 33 and lengthwise of the projecting roll on the ascending side of the same so that its inner or front edge projects into the outer part of the stream of liquid which is being lifted by the roll and deflects the same laterally away from the roll and over the upper end of the partition 33 and into the supply trough, while the remaining inner part of this stream is projected upwardly and spread out into fan shaped spray by the centrifugal action of the rotating roll, as shown in Figure 5. This blade may be moved radially toward and from the periphery of the projecting roll and also adjusted into various angles relative thereto, this being effected in the structure shown in Figure 5 by rock arms 44 pivotally connected at their upper ends by horizontal longitudinal pins 45 with the end walls of the supply trough and pivotally connected at their lower ends by horizontal longitudinal screws 46 with the ends of the blade, adjusting screws or rods 47 passing through stuffing boxes 48 in the outer longitudinal wall of the supply trough, links 49 connecting the inner ends of the adjusting screws with the blade, and adjusting nuts 50 journalled in brackets 51 on the supply trough but held against longitudinal movement and engaging with the outer threaded ends of the adjusting screws 47. Upon turning the screw nuts 50 in one direction the blade is moved toward the projecting roll and vice versa, and upon tilting the blade or arranging the same radially relatively to the roll the blade can be adapted to the character of the material under treatment.

For the purpose of confining within certain limits the spray of liquid which is thrown off by the projecting roll a confining shield 38 is provided which is arranged over the rear part of the top and the descending part of the roll and operates to intercept the rear part of the fan shaped stream of liquid spray and direct the same downwardly between this shield and the roll so that the intercepted part of the spray is returned to the feed trough. This shield is preferably curved concentrically with the projecting roll and so mounted that it is adjustable circumferentially relatively to the roll for the purpose of cutting off or intercepting the spray at different places as desired or to meet certain requirements. For this purpose the shield is secured to lugs 52 on the end walls of the feed trough by means of bolts 53 passing through circumferential slots 54 in the end portions of the shield.

By providing the cylindrical body of the projecting roll with circumferential ribs which form a plurality of alternating grooves there between a larger area of contact between the roll and liquid is obtained which facilitates the adhesion of the liquid to the roll and increases the liquid lifting and spraying capacity accordingly. These ribs also operate to cut through the liquid when the same is of a viscous nature and aid in obtaining an effective grip or adhesion of the roll on the liquid. As the under side of the roll dips into the liquid the latter fills its circumferential grooves to the bottom thereof and therefore picks up a large quantity of liquid. As the roll rotates and rises with its ascending part out of the liquid that part thereof within the grooves of the roll adjusts itself and gradually moves under the effects of centrifugal force from the inner to the outer parts of the walls of the grooves formed by the ribs so that the speed of the liquid is gradually increased and finally the liquid is thrown off the roll in a finely divided spray from the time the roll leaves the liquid until it again dips into the same.

The employment of the controlling blade permits of regulating the distribution of the liquid and obtaining a steady, continuous and uniform spray notwithstanding that there may be a variation in the level of the liquid in the feed trough because the blade can be adjusted to maintain the stream of the desired thickness and cut off or intercept the excess thickness of the same regardless of any variation in the thickness of this excess part of the liquid stream. This blade also insures a continuous discharge of the surplus liquid into the supply trough which is especially advantageous when operating under vacuum for the purpose of destroying foaming of the incoming liquid by breaking up the bubbles and allowing the escape of the air and gas within the same.

The angle which should be assumed by the controlling blade relative to the projecting roll is dependent upon the viscosity of the solution which is to be sprayed and its qualities of adhering to the moving surface of the projecting roll. When operating on liquids having good adhesive qualities the controlling blade may be arranged on a radial line from the axis of the roll, but when the liquid has poor adhesive properties then it is necessary to set the blade at such an angle to a radial line of the roll that part or all of the liquid by centrifugal action from the roll against the blade will be deflected back again by the blade toward the roll and compelled to issue therefrom in the form of a spray after passing the blade.

This spraying apparatus can be utilized to advantage for depositing solid containing liquids upon heated or cooled surfaces for the purpose of drying or cooling the same and also for cooking the liquids or crystallizing the same.

In Figures 3 and 4 is shown an apparatus for drying liquids by delivering the same in the form of a spray upon the exterior of an internally heated drum 55 which latter is rotatably mounted within a drying chamber 56 from which the vapors are forcibly withdrawn through an outlet 57 so as to create a vacuum within the drying chamber. The interior of this drum may be heated by steam, hot water, electricity or in any other suitable manner. The liquid to be dried is delivered by the spraying device containing my invention through an opening 58 in the bottom of the drying chamber and against the underside of the drum. For this purpose the upper edges of the feed and supply troughs of the spraying apparatus are engaged with the underside of the drying chamber around the bottom opening 58 thereof so as to form a tight joint therewith. In this construction the shield 381 is fixed in a definite position relative to the projecting roll instead of being adjustable circumferentially, as shown in Figure 5. As the drum 55 turns in the direction of the arrow in Figure 3, the liquid spray delivered against the underside of the same is levelled by a spreading blade 59 and before the liquid thus deposited on the drum again reaches the depositing place it has dried on the drum and is removed therefrom by a scraper knife or blade 60 which directs the dried material into a conveyor trough 61 from which it is carried away by a conveyor screw 62.

By delivering the liquid to be dried upon the rotating drum in the form of a spray, which is fan shaped circumferentially of the drum, the coating or film of material on the drum is built up by successive deposits of liquid, thereby obtaining a more uniform deposit which yields a superior and denser product.

Figure 2:
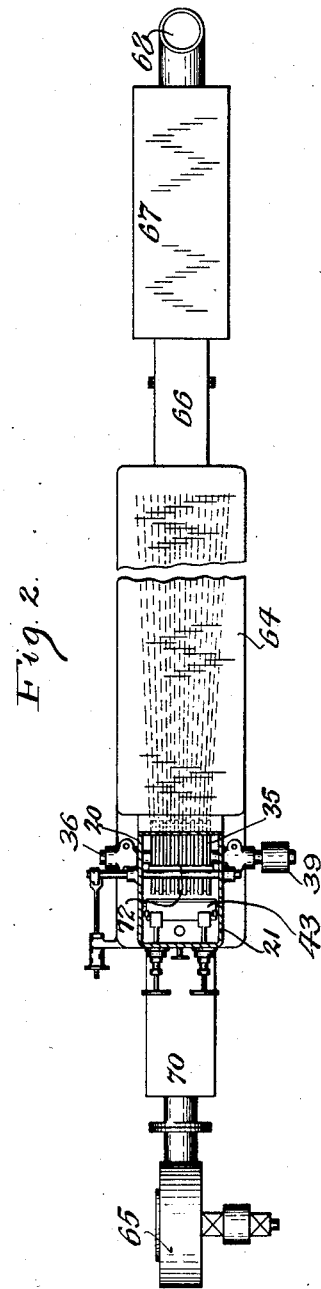
Figure 2, is a top plan view thereof, partly in section.

Another application of my invention is shown in Figures 1 and 2, in which a spraying apparatus embodying my improvements operates to deliver a spray of liquid to be dried through an opening 63 into the upper part of a drying chamber 64 where the same encounters a hot current of air which absorbs the moisture in the minute drops of liquid and causes the dried residue to fall in the form of powder to the bottom of this chamber. The heated air for this purpose is supplied by a blower 65 from the outlet of which the air first passes through a heater 70 and then enters the drying chamber below the spray inlet 63. The heated air passes forward through the drying chamber as it absorbs the moisture from the sprayed solution and then escapes through an outlet 66 at the top of the drying chamber and then passes through a dust separator 67 which removes any solid particles which may have become entrained in the air before the same escapes to the atmosphere through an outlet flue 68. The dried or powdered residue of the solution which drops to the bottom of the drying chamber is removed therefrom by a conveyer 69.

In the form of liquid spraying device shown in Figures 1 and 2 the projecting roll is arranged sufficiently close to the partition 33 that the latter serves as a baffle for keeping the liquid close to the ascending part of the projecting roll and enabling the same to obtain a good adhesive frictional grip thereon. In this application of my invention the rear wall 71 of the feed trough is carried upwardly around the projecting roll a sufficient extent to serve as a shield for cutting down the width of the fan shaped spray of liquid thrown from the projecting roll and an auxiliary controlling blade 72 is also employed between the main blade and the shield 71. This auxiliary blade further reduces the width of the fan shaped spray of liquid as it enters the drying chamber.

Instead of pivotally mounting the controlling blade on the adjacent part of the casing, as shown in Figure 5, substantially the same effect may be obtained by sliding the opposite ends of the controlling blade in horizontal guide ways 73 on the casing, one of which is shown in Figure 8.

The ribs of the projecting roll may either be arranged annularly on the cylindrical body, as shown in Figure 2, or the same may be arranged thereon in the form of a continuous spiral or screw thread, as shown in Figures 4 and 7. These ribs may also be either square in cross section, as shown at 35 in Figure 2, and at 352 in Fig. 10, or the same may be tapering or V-shaped in cross section, as shown at 351 and 353 in Figures 9 and 11 respectively. When the ribs of the projecting roll are of annular form the front edge of the controlling blade may be made of corresponding shape to fit the annular grooves between the annular ribs of the cylindrical body, as shown at 432 and 433 in Figures 10 and 11 respectively, but when the ribs are of spiral form the edges of the controlling blade can only approach close to the outer edges of these ribs, and this edge is therefore made straight, as shown at 43 and 431 in Figures 2 and 9 respectively.

When spiral ribs are employed the same operate to produce a continuous spray of liquid by each thread or rib, which spray moves continuously from one end of the roll to the other.

Instead of merely drying or dessicating the liquid sufficient heat may be supplied to the drum in the structure shown in Figures 3 and 4, so that the liquid solution, for example a mixture of flour and water, may be heated on the drum sufficient to cook and dry the same in one operation.

By supplying a cooling medium to the interior of the drum the liquid sprayed on the outer side of the same may be either cooled or crystallized. When drying such liquids as sulphite waste containing 40 to 50 percent solids, and skim milk containing 30 to 35 percent solids a peripheral speed of 50 to 60 feet per second of the projecting roll gives satisfactory results, but this speed must be determined in accordance with the requirements of each liquid depending on its viscosity, density and other characteristics.

It has been found by extensive experimentation with apparatuses of the character forming the subject of this invention that the surface of the rotary member, whereby the liquid to be concentrated is lifted, must be provided with comparatively shallow ribs so that when the cylinder engages its underside with the surface of the liquid, the liquid will be confined within the grooves formed between the ribs and thereby enable the sides of the grooves to obtain a firm grip or hold on the liquid which is much stronger than the peripheral surface of the bottom of these grooves and the outer edges of the ribs. It has also been found that a substantial grip or hold of the cylindrical lifting member can only be obtained if the liquid is confined close to the underside of the cylinder and over a substantial part thereof circumferentially. Otherwise the liquid, after being engaged by the cylinder will immediately fly off again before it has acquired any considerable momentum, whereas in the present case the liquid is confined close to the cylinder for a sufficient length of time to cause the liquid to partake of the speed of the cylinder so that when the liquid is finally released, it will be thrown with considerable power against the heated surface of the drum 55, upon which it is dried. A substantial increase in the capacity of the machine is thus obtained which is very important, particularly when desiccating liquid containing a substantial amount of solids.

I claim as my invention:—

1. An apparatus for spraying liquid comprising a feed trough adapted to contain the liquid to be sprayed, a cylinder rotatably mounted in said trough and provided on its periphery with circumferential ribs, the lower parts of said cylinder and ribs positioned to dip into the liquid and project the same in the form of a spray and means for confining the liquid close to the underside of said cylinder and ribs.

2. An apparatus for spraying liquid comprising a feed trough adapted to contain the liquid to be sprayed, a cylinder mounted in said trough so as to rotate about a horizontal axis and provided on its periphery with circumferential ribs, the lower parts of said cylinder and ribs positioned to dip into the liquid and project the same in the form of a spray, and means for confining the liquid close to the rising parts of said cylinder and ribs.

3. An apparatus for spraying liquid comprising a feed trough adapted to contain the liquid to be sprayed, a cylinder mounted in said trough so as to rotate about a horizontal axis and provided on its periphery with circumferential ribs the lower parts of said cylinder and ribs positioned to dip into the liquid and project the same in the form of a spray, and means for confining the liquid close to the rising parts of said cylinder and ribs, comprising a baffle curved concentrically with the axis of said cylinder and ribs and arranged close to the underside of said cylinder and ribs.

4. An apparatus for spraying liquid comprising a feed trough adapted to contain the liquid to be sprayed, a cylinder mounted in said trough so as to rotate about a horizontal axis and provided on its periphery with circumferential ribs, the lower parts of said cylinder and ribs positioned to dip into the liquid and project the same in the form of a spray, and means for confining the liquid close to the rising parts of said cylinder and ribs, comprising a baffle curved concentrically with the axis of said cylinder and ribs and arranged close to the underside of said cylinder and ribs, and means for adjusting said baffle radially toward and from said cylinder and ribs.

5. An apparatus for spraying liquid comprising a feed trough adapted to contain the liquid to be sprayed, a projecting roll rotatably mounted in said trough and positioned to dip with its underside into said liquid and to project the same, and a radial controlling blade arranged adjacent to the rising side of said roll and adapted to intercept a part of the stream of liquid lifted by said roll and direct the same back into the trough.

6. An apparatus for spraying liquid comprising a feed trough adapted to contain the liquid to be sprayed, a projecting roll rotatably mounted in said trough and positioned to dip with its underside into said liquid and to project the same, a radial controlling blade arranged adjacent to the rising side of said roll and adapted to intercept a part of the stream of liquid lifted by said roll and direct the same back into the trough and means for adjusting said blade radially toward and from said roll.

7. An apparatus for spraying liquid comprising a feed trough adapted to contain the liquid to be sprayed, a cylinder rotatably mounted in said trough and provided on its periphery with circumferential ribs, the lower parts of said cylinder and ribs positioned to dip into the liquid and project the same in the form of a spray and a radial controlling blade arranged adjacent to the rising side of said cylinder and ribs and adapted to intercept part of the stream of liquid lifted by said cylinder and ribs and direct the same back into the trough.

8. An apparatus for spraying liquid comprising a feed trough adapted to contain the liquid to be sprayed, a cylinder rotatably mounted in said trough and provided on its periphery with circumferential ribs, the lower parts of said cylinder and ribs positioned to dip into the liquid and project the same in the form of a spray and a controlling blade arranged adjacent to the rising side of said cylinder and ribs and adapted to intercept part of the stream of liquid by said cylinder and ribs, and said blade being provided at its front edge with teeth which project into the spaces between said ribs.

9. An apparatus for spraying liquids comprising a feed trough adapted to contain the liquid to be sprayed, a supply trough arranged adjacent to the feed trough and adapted to contain a supply of said liquid and having its lower part communicating with the lower part of said trough, a projecting roll rotatably mounted in the feed trough and positioned to dip with its lower part in the liquid therein and project the same in the form of a stream and a radial controlling blade arranged to intercept a part of said stream and direct the same into said supply trough.

10. An apparatus for spraying liquids comprising a feed trough adapted to contain the liquid to be sprayed, a supply trough arranged adjacent to the feed trough and adapted to contain a supply of said liquid, a projecting roll rotatably mounted in the feed trough and positioned to dip with its lower part in the liquid therein and project the same in the form of a stream, a radial controlling blade arranged to intercept a part of said stream and direct the same into said supply trough, and means for conducting liquid from said supply trough to said feed trough.

11. An apparatus for spraying liquids comprising a feed trough adapted to contain the liquid to be sprayed, a supply trough arranged adjacent to the feed trough and adapted to contain a supply of said liquid, a projecting roll rotatably mounted in the feed trough and positioned to dip with its lower part in the liquid therein and project the same in the form of a stream, a radial controlling blade arranged to intercept a part of said stream and direct the same into said supply trough, a conduit for conducting liquid from said supply trough to said feed trough, and a valve arranged in said conduit for regulating the flow of liquid from the supply trough to said feed trough.

12. An apparaus for spraying liquid comprising a feed trough adapted to contain the liquid to be sprayed, a projecting roll rotatably mounted in said feed trough and positioned to dip with its lower part in said liquid and to project the same in the form of a stream, a radial controlling blade adapted to intercept a part of said stream on the ascending side of said roll, and a shield arranged above the roll and adapted to intercept another part of said stream beyond said blade.

13. An apparatus for spraying liquid comprising a feed trough adapted to contain the liquid to be sprayed, a projecting roll rotatably mounted in said feed trough and positioned to dip with its lower part in said liquid and to project the same in the form of a stream, a radial controlling blade arranged adjacent to the ascending side of the roll and adapted to intercept a part of said stream, and a curved shield arranged concentrically relatively to said roll beyond said blade and adapted to intercept another part of said stream.

14. An apparatus for spraying liquid comprising a feed trough adapted to contain the liquid to be sprayed, a projecting roll rotatably mounted in said feed trough and positioned to dip with its lower part in said liquid and to project the same in the form of a stream, a radial controlling blade arranged adjacent to the ascending side of the roll and adapted to intercept a part of said stream, a curved shield arranged concentrically relatively to said roll beyond said blade and adapted to intercept another part of said stream and means for adjusting said shield circumferentially about said roll.

CHARLES O. LAVETT.